United States Patent
Lindner et al.

(10) Patent No.: US 9,145,855 B2
(45) Date of Patent: Sep. 29, 2015

(54) MOTOR VEHICLE INTERNAL COMBUSTION MOTOR EXHAUST GAS RECIRCULATION VALVE HAVING A MECHANICALLY COMMUTATED DRIVE MOTOR

(75) Inventors: Enrico Lindner, Penig (DE); Mathias Zill, Neukirchen (DE); Ronald Rathke, Doebeln (DE); Frank Schwabbauer, Hartha (DE)

(73) Assignee: PIERBURG PUMP TECHNOLOGY GMBH, Neuss (DE)

( * ) Notice: Subject to any disclaimer, the term of this patent is extended or adjusted under 35 U.S.C. 154(b) by 394 days.

(21) Appl. No.: 13/821,239

(22) PCT Filed: Jun. 29, 2011

(86) PCT No.: PCT/EP2011/060910
§ 371 (c)(1),
(2), (4) Date: May 17, 2013

(87) PCT Pub. No.: WO2012/031793
PCT Pub. Date: Mar. 15, 2012

(65) Prior Publication Data
US 2013/0220291 A1 Aug. 29, 2013

(30) Foreign Application Priority Data
Sep. 7, 2010 (EP) .................................. 10175655

(51) Int. Cl.
*F02M 25/07* (2006.01)
*H02K 11/02* (2006.01)
*H02K 5/14* (2006.01)

(52) U.S. Cl.
CPC ....... *F02M 25/0772* (2013.01); *F02M 25/0773* (2013.01); *H02K 11/026* (2013.01); *H02K 5/148* (2013.01); *Y02T 10/121* (2013.01)

(58) Field of Classification Search
CPC .............. F02M 25/07; F02M 25/0772; F02M 25/0773; F02M 25/0785; F02M 25/0787; F01L 3/20; H02K 5/08; H02K 7/116
USPC ................... 123/188.1, 188.2, 190.1, 568.18, 123/568.21–568.26; 251/129.11–129.13; 310/43, 51, 52, 83
See application file for complete search history.

(56) References Cited

U.S. PATENT DOCUMENTS 5,636,431 A * 6/1997 Ade ................................. 29/596
5,937,835 A * 8/1999 Turner et al. .............. 123/568.24

(Continued)

FOREIGN PATENT DOCUMENTS

CN 1497820 A 5/2004
CN 101110531 A 1/2008

(Continued)

*Primary Examiner* — John Kwon
*Assistant Examiner* — Johnny H Hoang
(74) *Attorney, Agent, or Firm* — Norman B. Thot

(57) ABSTRACT

An electric exhaust gas recirculation valve for an internal combustion engine of a motor vehicle includes a motor rotor. A drive motor is configured to be mechanically commutated. The drive motor comprises a plastic carrier panel lying in a transverse plane arranged at a longitudinal end of the drive motor. The plastic carrier panel comprises, on a side facing the motor rotor, at least two commutator brushes and suppression reactance coils assigned to the at least two commutator brushes. Suppression capacitors are arranged on a side averted from the motor rotor. A valve body. A reduction gearing is connected to the drive motor. The reduction gearing is mechanically connected to the valve body.

7 Claims, 3 Drawing Sheets

(56) References Cited

U.S. PATENT DOCUMENTS

| | | |
|---|---|---|
| 5,949,173 A | 9/1999 | Wille et al. |
| 6,443,135 B1 * | 9/2002 | Dismon et al. ............ 123/568.18 |
| 6,663,362 B1 | 12/2003 | Lentz et al. |
| 6,729,314 B2 * | 5/2004 | Radhamohan et al. .. 123/568.21 |
| 6,997,169 B2 * | 2/2006 | Akao et al. ................ 123/568.24 |
| 8,075,285 B2 * | 12/2011 | Dinkel et al. .............. 417/410.1 |
| 2004/0007221 A1 * | 1/2004 | McConnell .............. 123/568.21 |
| 2004/0115961 A1 | 6/2004 | Burhenne et al. |
| 2005/0281498 A1 | 12/2005 | Hayashi et al. |
| 2007/0107708 A1 * | 5/2007 | Uchiyama et al. ....... 123/568.18 |
| 2008/0029073 A1 * | 2/2008 | Klipfel et al. ............ 123/568.11 |
| 2008/0048507 A1 * | 2/2008 | Kanda et al. .................... 310/42 |
| 2009/0243425 A1 | 10/2009 | Omori et al. |
| 2010/0117470 A1 * | 5/2010 | Stubner et al. .................. 310/72 |
| 2010/0319663 A1 * | 12/2010 | Gracner et al. .......... 123/568.23 |

FOREIGN PATENT DOCUMENTS

| | | |
|---|---|---|
| CN | 101546937 A | 9/2009 |
| DE | 10 2007 056 326 A1 | 5/2009 |
| DE | 10 2008 008 290 A1 | 8/2009 |
| EP | 0 887 540 A2 | 12/1998 |
| JP | 2003-515059 A | 4/2003 |
| JP | 2006-9819 A | 1/2006 |
| JP | 2010-38082 A | 2/2010 |
| JP | 2010-65528 A | 3/2010 |

* cited by examiner

MOTOR VEHICLE INTERNAL COMBUSTION MOTOR EXHAUST GAS RECIRCULATION VALVE HAVING A MECHANICALLY COMMUTATED DRIVE MOTOR

CROSS REFERENCE TO PRIOR APPLICATIONS

This application is a U.S. National Phase application under 35 U.S.C. §371 of International Application No. PCT/EP2011/060910, filed on Jun. 29, 2011 and which claims benefit to European Patent Application No. 10175655.9, filed on Sep. 7, 2010. The International Application was published in German on Mar. 15, 2012 as WO 2012/031793 A1 under PCT Article 21(2).

FIELD

The subject matter of the present invention relates to an electric exhaust gas recirculation valve for an internal combustion engine of a motor vehicle having a mechanically commutated drive motor.

BACKGROUND

Exhaust gas recirculation valves serve to control exhaust gas recirculation in internal combustion engines in the interest of reducing pollutants in the exhaust gas. External exhaust gas recirculation valves are not arranged in the internal combustion engine block, but outside the engine block. They therefore generally do not have an active cooling, so that all components of the exhaust gas recirculation valve are subjected to high thermal stresses. The essential functional parts of an external exhaust gas recirculation valve are constituted by an electric drive motor, a reduction gearing, and a valve body. The gearing may be any gearing that is as compact as possible, for example, a planetary gearing, a worm wheel gearing, etc.

For reasons of costs, a mechanically commutated DC drive motor is used as the drive motor for exhaust gas recirculation valves. A drawback of mechanical commutation is the relatively strong electromagnetic interference generated in the process. Reactance coils and capacitors are generally used to suppress the interference in a mechanically commutated motor, which are mounted as close to the rotor as possible to achieve the best suppression effect possible. However, capacitors can only tolerate temperatures of 150° C., so that they cannot readily be used for suppression in exhaust gas recirculation valves of the common type, since, in addition, also the motor rotor is heated to temperatures far above 200° C. in operation.

SUMMARY

An aspect of the present invention is to provide a motor vehicle internal combustion exhaust gas recirculation valve with an improved suppression for the mechanically commutated drive motor.

In an embodiment, the present invention provides an electric exhaust gas recirculation valve for an internal combustion engine of a motor vehicle which includes a motor rotor. A drive motor is configured to be mechanically commutated. The drive motor comprises a plastic carrier panel lying in a transverse plane arranged at a longitudinal end of the drive motor. The plastic carrier panel comprises, on a side facing the motor rotor, at least two commutator brushes and suppression reactance coils assigned to the at least two commutator brushes. Suppression capacitors are arranged on a side averted from the motor rotor. A valve body. A reduction gearing is connected to the drive motor. The reduction gearing is mechanically connected to the valve body.

BRIEF DESCRIPTION OF THE DRAWINGS

The present invention is described in greater detail below on the basis of embodiments and of the drawings in which.

DETAILED DESCRIPTION

Figure 1:
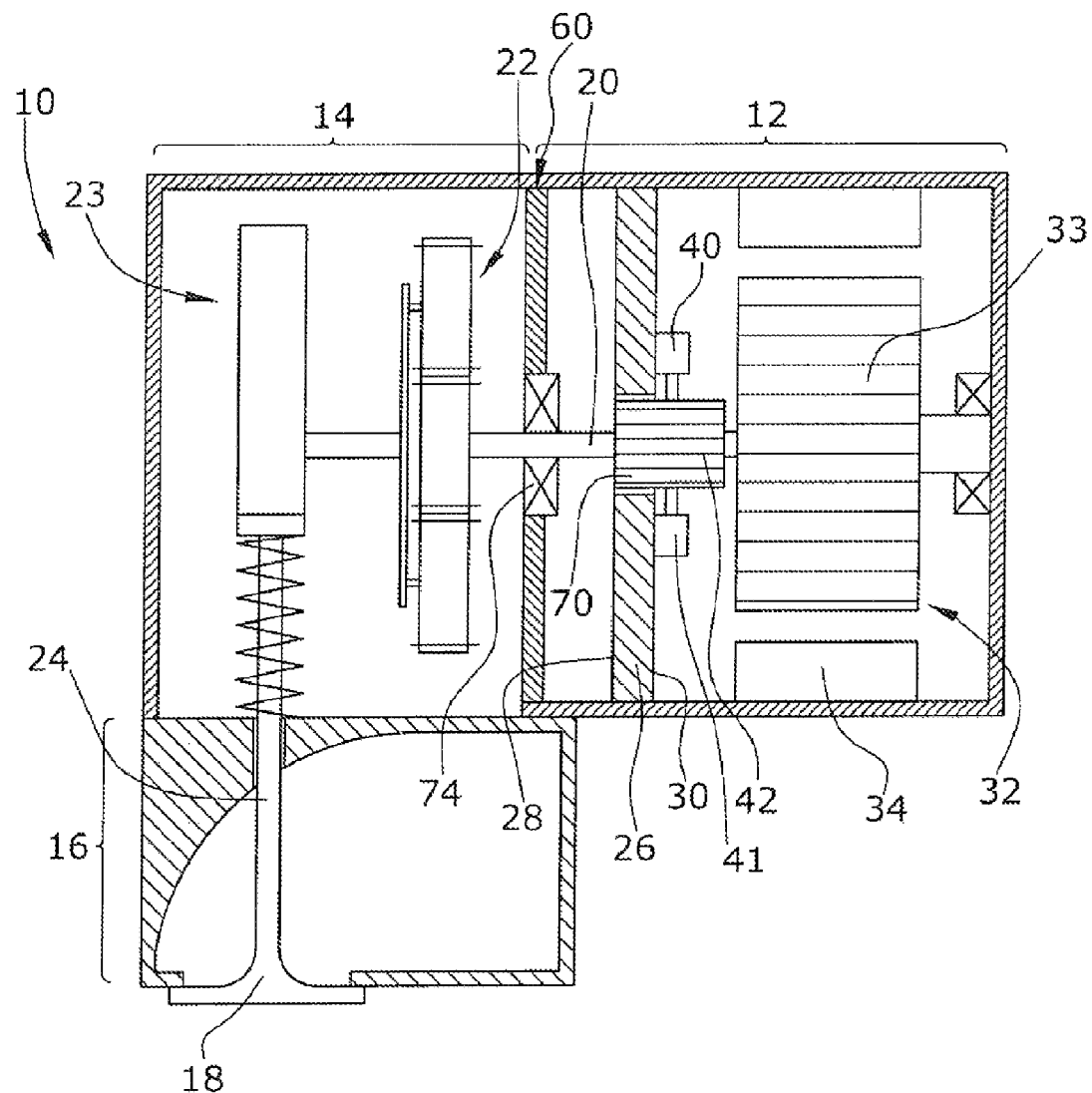
FIG. 1 is an illustration of an electric exhaust gas recirculation valve of an internal combustion engine of a motor vehicle.
Figure 2:
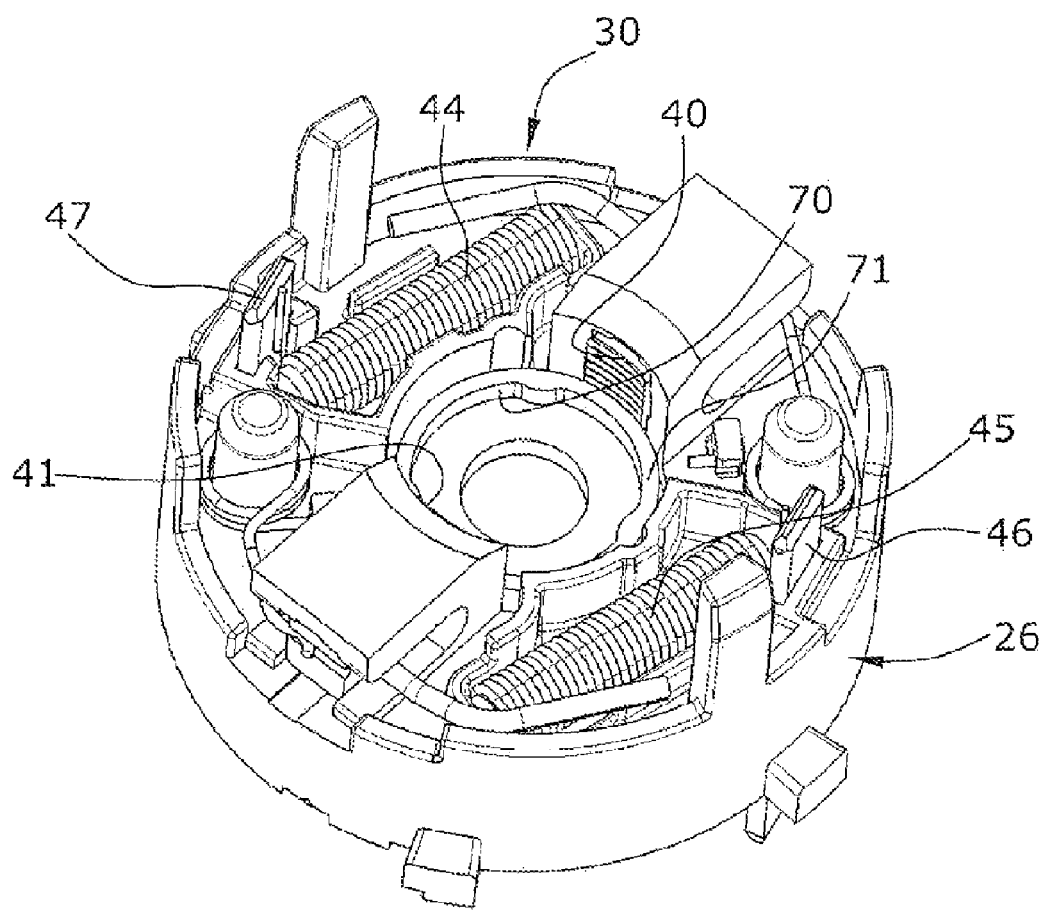
FIG. 2 is a perspective view on the proximal side of the carrier panel of the exhaust gas recirculation valve in FIG. 1.
Figure 3:
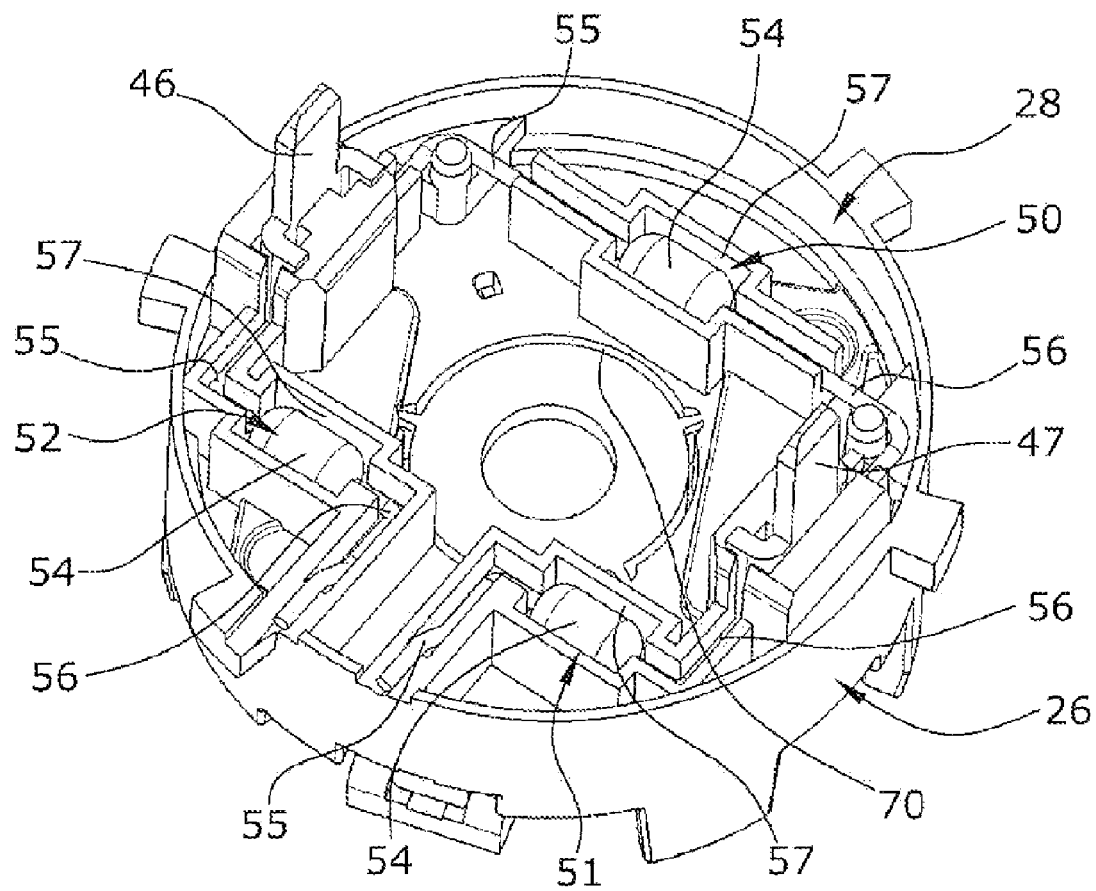
FIG. 3 is a perspective view on the distal side of the carrier panel of the exhaust gas recirculation valve in FIG. 1.

In the exhaust gas recirculation valve of the present invention, a plastic carrier panel that lies in a transverse plane is arranged at a longitudinal end of the drive motor, for example, at its longitudinal end facing towards the gearing or the valve body, respectively, which panel has at least two commutator brushes and suppression reactance coils assigned to the commutator brushes provided on its proximal side, i.e., facing towards the motor rotor. On the distal side of the carrier panel, i.e., on the side averted from the motor rotor, one or a plurality of suppression capacitors is/are arranged. The suppression capacitors are thus arranged as far as possible from the motor rotor. The plastic carrier panel further acts as a thermal insulation from the motor coils of the drive motor.

The suppression reactance coils are formed by a ferrite or ceramic core and a copper column, and are therefore generally good thermal conductors and heat storages. Due to the fact that the reactance coils are arranged on the proximal side of the carrier panel, the heat input towards the distal side of the carrier panel, and thus the heat input towards the suppression capacitors, is maintained as low as possible. The reactance coils are further arranged very close, in electric terms, to the commutator, so that they can provide their filtering effect with maximum efficiency.

Tests have shown that such an arrangement of the suppression capacitors make it possible to provide with a high reliability that, even under unfavorable conditions, the capacitors will not heat up to temperatures above 150° C. so that they will not be destroyed.

In an embodiment of the present invention, all suppression reactance coils lie in a transverse plane. The axial length of the drive motor is thus kept as compact as possible. This is important because the structural space in the vicinity of the internal combustion engine block is per se very limited.

In an embodiment of the present invention, each suppression capacitor comprises a capacitor body and two connecting lines, for example, lying on a single straight line, the connecting lines lying in a transverse plane of the drive motor. The capacitor is thus not arranged standing on the carrier panel, but lying on the carrier panel. This measure also makes it possible to keep the axial length of the drive motor as compact as possible.

In an embodiment of the present invention, the carrier panel comprises capacitor pockets in which the capacitor body is immobilized. The capacitor body may, for example, be locked axially in the associated capacitor pocket. The capacitor pocket primarily serves to mechanically fix the capacitor. The capacitor further enhances the thermal insulation of the capacitor and, in particular, of the capacitor body.

In an embodiment of the present invention, the capacitor body is cast/potted in the capacitor pocket using a casting/potting compound. A very good mechanical fixation is obtained in this manner. The casting/potting compound also further enhances the thermal insulation of the capacitor or the capacitor body, respectively.

In an embodiment of the present invention, the carrier panel has a central opening for the motor shaft. The central opening can, for example, have the only axially continuous opening in the carrier panel except for the passages for electric lines. The convective thermal input from the proximal to the distal side of the carrier panel is thereby kept as low as possible.

In an embodiment of the present invention, a respective connecting line of the capacitors is electrically contacted with a motor contact by clamping, which motor contact protrudes axially through the carrier panel. No material electrical connection thus exists, but exclusively an electrical connection by clamping or crimping, which is much simpler and more economic with respect to assembly.

The following is a detailed description of an embodiment of the present invention with reference to the drawings.

The electric exhaust gas recirculation valve 10 of an internal combustion engine of a motor vehicle substantially comprises three components, namely an electric drive motor 12, a reduction gearing 14 and a valve module 16 with a valve body 18. The drive motor 12 is a mechanically commutated motor whose motor shaft 20 is connected with the planetary gearing 22 which itself uses a cam wheel 23 to smoothly move a valve rod 24 with the valve body 18 axially between an open position and a closed position.

At its proximal end, the drive motor 12 has a plastic carrier panel 26 that lies in a transverse plane of the drive motor 12. The carrier panel 26 itself has a distal side 28 and a proximal side 30. The proximal side 30 of the carrier panel 26 faces towards a motor rotor 32 with rotor coils 33 and towards a motor stator 34 of the drive motor 12, while the distal side 20 faces away from the motor rotor 32 and from the motor stator 34, which is permanently magnetized.

On the proximal side 30 of the carrier panel 26, two commutator brushes 40, 41 are provided which, together with a commutator ring 42, form the commutator via which the rotor coils 32 are energized. Further, two suppression reactance coils 44, 45 are arranged on the proximal side 30, whose one end is connected with a respective brush 40, 41 and whose other end is connected with a respective motor contact 46, 47 that protrudes axially through the carrier panel 26. The reactance coils 44, 45 lie in a transverse plane.

On the distal side 28 of the carrier panel 26, the two motor contacts 46, 47 can be seen which are directly electrically connected with each other through three suppression capacitors 50, 51, 52, as well as with a metal motor housing end cover 60. The three capacitors 50, 51, 52 are each substantially formed by a capacitor body 54 and two connecting lines 55, 56. The capacitor body 54 and the connecting lines 55, 56 of all three capacitors 50, 51, 52 substantially lie in a transverse plane. The capacitor bodies 54 are each immobilized by clamping or locking in capacitor pockets 57 of the carrier panel 26. The capacitor bodies 54 may be cast/potted in the capacitor pockets 57 using a suitable plastic casting/potting compound/material.

The carrier panel 26 has a central opening 70 through which the motor shaft 20 passes. The gearing-side end of the motor shaft 20 is supported by means of a roller bearing 74 held by the housing end cover 60. The carrier panel 26 has no further open openings in the axial direction.

The carrier panel 26, prior to assembly, comprises a brush retaining ring 71 that is ejected during assembly by the commutator ring 42 passing through the same.

The present invention is not limited to embodiments described herein; reference should be had to the appended claims.

What is claimed is:

1. An electric exhaust gas recirculation valve for an internal combustion engine of a motor vehicle, the electric exhaust gas recirculation valve comprising:
    a motor rotor;
    a drive motor configured to be mechanically commutated, the drive motor comprising:
    a plastic carrier panel lying in a transverse plane arranged at a longitudinal end of the drive motor, the plastic carrier panel comprising, on a side facing the motor rotor, at least two commutator brushes and suppression reactance coils assigned to the at least two commutator brushes, and suppression capacitors arranged on a side averted from the motor rotor;
    a valve body; and
    a reduction gearing connected to the drive motor, the reduction gearing being mechanically connected to the valve body.

2. The electric exhaust gas recirculation valve as recited in claim 1, wherein the suppression reactance coils lie in a transverse plane.

3. The electric exhaust gas recirculation valve as recited in claim 1, wherein each of the suppression capacitors comprises a capacitor body and two connecting lines which are configured to lie together in a transverse plane.

4. The electric exhaust gas recirculation valve as recited in claim 3, wherein the plastic carrier panel further comprises a capacitor pocket, the capacitor body being arranged in the capacitor pocket and being configured so as to be immobilized.

5. The electric exhaust gas recirculation valve as recited in claim 4, wherein the capacitor body is cast in the capacitor pocket using a casting material.

6. The electric exhaust gas recirculation valve as recited in claim 3, further comprising motor contacts configured to protrude axially through the plastic carrier panel, wherein a respective connecting line of the suppression capacitors is electrically contacted with a motor contact by clamping.

7. The electric exhaust gas recirculation valve as recited in claim 1, further comprising a motor shaft, and the plastic carrier panel further comprising a central opening for the motor shaft.

* * * * *